April 25, 1939.  W. C. ANDERSON  2,155,387
MAP
Filed Aug. 22, 1936
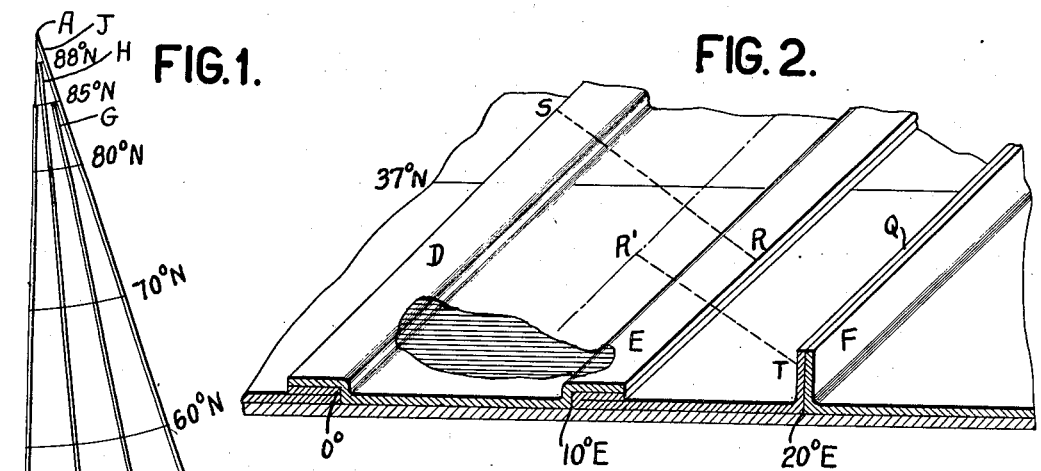
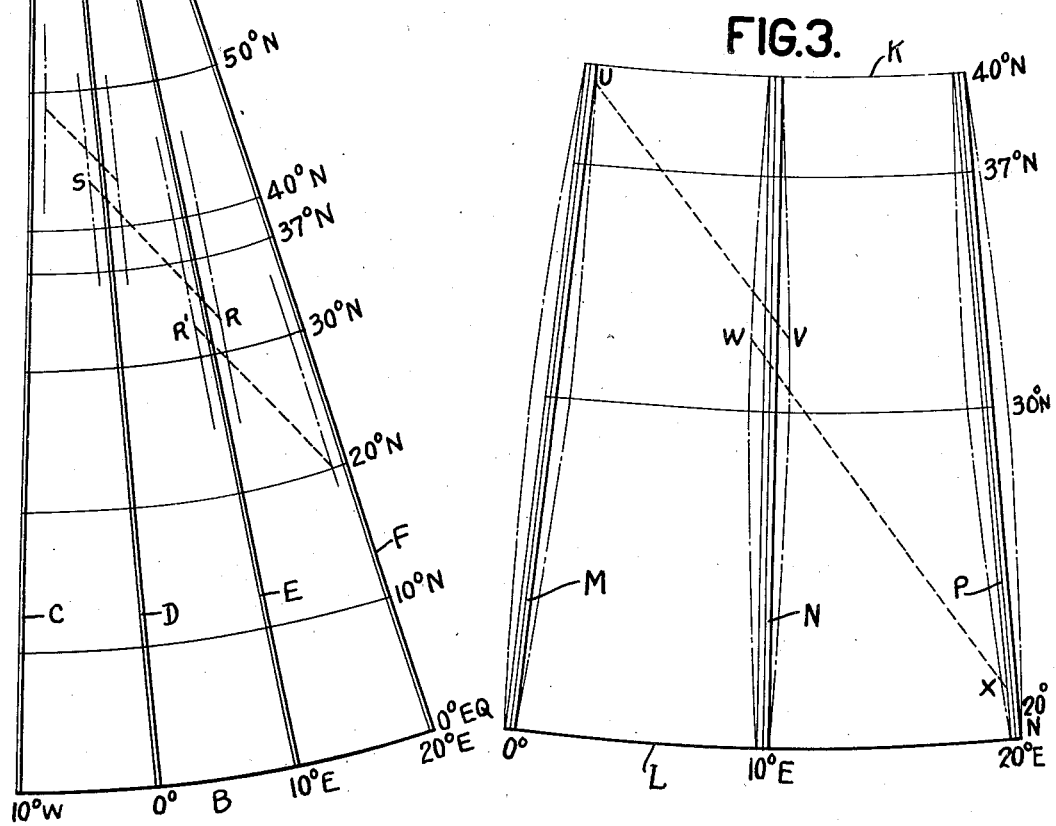
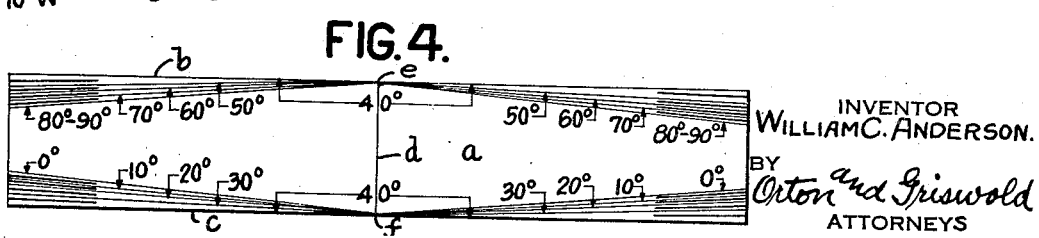
INVENTOR
WILLIAM C. ANDERSON.
BY
Orton and Griswold
ATTORNEYS

Patented Apr. 25, 1939

2,155,387

UNITED STATES PATENT OFFICE 2,155,387

MAP

William C. Anderson, Montclair, N. J.

Application August 22, 1936, Serial No. 97,426

13 Claims. (Cl. 35—40)

The invention relates in general to maps representing portions of the spherical surface of the earth and the invention also relates to a method for plotting great circle courses utilizing the map herein featured and the invention also relates to a protractor for use in practicing the method.

The primary object of the invention is to provide a form of map representing the whole, or a portion of the spherical surface of the earth with the parts constructed so that when manipulated in a prescribed way all distances, areas and directions may be shown thereon in their true proportion as if measured directly on the corresponding spherical surface represented.

Another object of the invention is to provide a form of map forming in effect the flat surface representation with physical portions of the earth's surface indicated thereon and on which great circle courses may be drawn directly thereon by means of straight lines forming parts of a broken line indication of the great circle course.

Broadly, the invention contemplates forming the map as a developed surface of a cone, the pole being the apex and the base of the cone being the equator; the distances along the elements of the conic surface constituting the lines of longitude, as well as the distances laid off along the equator or lines of latitude, being all laid off to a true scale. It is obvious, of course, that the true distances along the parallels of latitude between the equator and the pole are greater than the distance on the development of a representative cone. The present disclosure features the providing of flaps projecting from the surface of the map and arranged and proportioned to compensate for the difference between the flat surface area depicted on the map and the actual area as found on the spherical surface represented by the map. In other words, in the illustrated embodiment of the invention hereinafter described, the flaps represent the difference in projected areas between the true area and that shown between the elements of the conic surface represented on the map. When the map is used, the flaps may be folded down on either side of the elements representing radial projections of the true meridians on the conic surface depending upon whether the map area on one side or the other of the particular meridian is to be considered.

With reference to the method aspect of the disclosure two separated points on the map may be connected by a great circle course preferably by utilizing a protractor or chart provided with any regularly related locus lines to make the necessary correction as the course passes from one to the other side of each flap.

Various other objects and advantages of the invention will be in part obvious from an inspection of the accompanying drawing and in part will be more fully set forth in the following particular description of one form of device embodying the invention, and the invention also consists in certain new and novel features of construction and a combination of parts hereinafter set forth and claimed.

In the accompanying drawing:

Fig. 1 is plan view of a map of a small portion of the earth's surface representing a segment of the earth's surface between the equator and the North Pole and illustrating a preferred embodiment of the invention, and with a great circle course charted thereon;

Fig. 2 is a view on an enlarged scale of a portion of the map taken midportion of the showing in Fig. 1 and shown with two of its flaps bent down and the third in erect position;

Fig. 3 is a slightly modified form of map illustrating on an enlarged scale an embodiment of the invention representing a portion of the earth's surface remote from the North Pole; and Fig. 4 is a plan view of a protractor designed for use in practicing the method herein disclosed.

Referring to the showing in Fig. 1, the map illustrated represents the surface of the earth between the Pole A and the Equator B and between 10° W. and 20° E. with two other longitudinal lines; those at 0° and 10° E. being shown. There is also shown the intersecting parallels of latitude at 10° intervals and conventionally designated, but it is, of course, obviously within the scope of the disclosure to use any other scale of degrees depending upon the size and purpose of the map desired. Distances along the equator B are laid off to true scale and the length of each element of the conic surface, that is, the distances along the meridians provided with the flaps, are scaled equal to the length of the meridians of longitude of the surface of the earth. Along each element marking the interval of longitude is erected a flap, C, D, E and F, being shown in Fig. 1. Each of these flaps has the longitudinal element at its base, that is, it is hingedly mounted along the element so that it may be folded down to either side of the element in parallel relation to the map surface as shown to the left of Fig. 2. Each flap has the element as its base, and at each point along its length, its height is so scaled that the total distance from outside edge of one flap to outside edge of the adjacent flaps, when turned away from each other, as shown to the left of Fig. 2, equals the true scale distance on the surface of the earth between the respective meridians of longitude at that point. This distance is therefore the proportion of the circumference of the parallel of latitude at that point which the interval of longitude used bears to the total number of intervals of longitude comprising the entire spherical surface.

For instance, considering the ten degree interval of longitude used in the drawing, there would be a total of 36 such intervals, and the distance between the outside edges of the flaps, turned away, at, for example 37 degrees of latitude, equals 1/36 part of the circumference of the 37th parallel of latitude.

The radius of any parallel of latitude is determined by multiplying the radius of the earth by the sine of the complementary angle of the latitude.

Latitude 37 deg. 90 deg. minus 37 deg. equals 53 deg.
Radius of earth—3962
Log. 3962    3.59792
Log. sin 53 deg.    9.90234—10

Log. radius of
Parallel of
Latitude    3.50027

Radius, parallel of latitude, 3164.23 miles $$\frac{3164.23 \times 2 \times 3.1416}{36}$$

equals 552.3 miles, distance from outside edge to outside edge of flaps, turned away, that is the distance between 10° E. and 20° E. on the line 37° N. of Fig. 3 is 552.3 miles.

Thus considering the flaps D and E of Fig. 2 wherein the flaps are turned away from each other, then the exposed surface of the flap together with the surface therebetween represents the true projected surface between 0° and 10° E. Considering flap E turned in the opposite direction and flap F turned clock-wise from the erect position shown, the right hand side of flap E, the left hand side of flap F with the area therebetween represents the true projected area between 10° E. and 20° E. Thus by using both sides of the flaps for surface, the area due to spherical curvature is compensated for.

In the immediate vicinity of the pole, on smaller scale maps, the height of the flap may become so small as not to be easily measurable. It is therefore sometimes desirable to decrease the number of flaps as the pole is approached thus increasing the intervals between the flaps and the height of each individual flap. Thus in the embodiment illustrated in Fig. 1, all flaps are brought to the eighty-five degree parallel of latitude. Alternate flaps terminate at this point as, for instance, the flap indicated at G. The remainder of the flaps continue toward the pole and alternate flaps of the remainder terminate, as for instance, flap H, on the eighty-eight degree parallel of latitude. The remaining flaps such as the flaps indicated at J are continued to the pole. The height of the flaps are scaled so that in all cases the total distance from outside edge of adjacent flaps, when turned away from each other, equals the true scale distance between the meridians of longitude at that point. Thus the flaps at the eighty-fifth parallel of latitude do not merge with the surface of the map but have an appreciable height.

The same principle may be applied to smaller portions of the earth's surface in which event the map construction is based on the developed surface of the frustum of a cone, as shown in Fig. 3. True distances are scaled off on the extreme upper and lower parallel of latitude, as shown by the arc K representing, in the illustrated embodiment, the forty degree parallel of latitude and also on the arc L representing, in this instance, the twentieth degree parallel of latitude. The elements of the frustum of the cone are also scaled to equal true distances along the meridians of longitude indicated at 0°, 10° E. and 20° E. Flaps M—N—P are erected on the respective elements at each preselected intervals. As before, at each point of its length, the height of any one of these flaps is so scaled that the total distance from outside edge, say, of the M flap, erected on the 0° element and the N flap erected on the 10° E. element, when these flaps are turned away from each other, equals the true scale distance on the surface of the earth between the respective meridians of longitude, in this instance, ten degrees. Obviously since the concentric arcs K and L both bear the same relation to the true scale distance along these parallels, the height of the flap along the arcs K and L are both zero.

Since the distances along the elements and between the outside edges Q of the flaps are drawn to true scale, a straight line drawn between any two points from the surface bounded by the outside edges of the adjacent flaps when turned away from one another and parallel to the map surface will be the shortest distance between those two points on the surface of the earth and will consequently lie on a great circle of the earth's surface. Such two points are indicated at R—S in Fig. 2 and the straight line R—S forms a portion of the great circle including those two points. Land areas and physical parts of the earth's surface usually shown on maps may be depicted on this map and drawn to the same scale, on which the map is drawn and in the proper relation to the longitudes and latitudes. As shown in Fig. 2 the hatched area represents an island extending from about 2° or 3° to about 8° or 9° E. and thus is contained partly on the adjacent side faces of flaps D and E and in the flat space therebetween.

To pass from one side to the other of any given flap in drawing a great circle course requires, however, an angular adjustment due to the construction of the flap. Such angular adjustment varies with the spacing of the meridian intervals and with the latitude at the point at which the passing takes place. This variation is determined in the following manner:

The angular adjustment is equal, at any given point of latitude, to twice the angle formed by the edge of the flap with a line parallel to the base of the flap at that point. This angular adjustment can be measured by dividing the variation in the height of the flap in the vicinity of the point in question by the latitudinal distance in which the variation takes place, the resulting quotient being the tangent of half the angle of adjustment.

For example: With a ten degree longitudinal interval, at latitude 20 degrees, the height of the flap equals a scale distance of 56 miles. Selecting a latitudinal distance of one degree, equal to 69.15 miles, the height of the flap at 21 degrees latitude equals a scale distance of 57.8 miles. The tangent of half the angle of adjustment then equals $$\frac{57.8 - 56.0}{69.15} \text{ or } .02603$$

Half the angle of adjustment equals 1 degree, 30 minutes, and therefore the angle of adjustment equals 3 degrees in this instance.

Thus for the ten degrees longitudinal intervals shown in the drawing, for example, the adjustment is six degrees, four minutes at the equator, decreasing to zero at forty degrees parallel of longitude and then increasing to three degrees thirty-eight minutes at the eighty-ninth parallel of latitude. The angular adjustments from zero degrees to forty degrees of latitude are concave toward the pole. The angular adjustments from forty degrees to eighty-nine of latitude are convex toward the pole.

To make the angular adjustments at the edge of the flap in drawing a great circle course, the protractor shown in Fig. 4 may be used. The protractor comprises an oblong sheet $a$ of transparent material such as Celluloid, whereof the longer side edges $b$ and $c$ are parallel. Intermediate its ends, the protractor has inscribed thereon the center line $d$ perpendicular to the long edges $b$ and $c$. The points of intersection of the center line $d$ with the edges indicated respectively at $e$ and $f$. Radiating from these points $e$ and $f$ are a plurality of lines indicated on the scale by the indici fifty degrees, sixty degrees, seventy degrees, etc., and on the other edge, zero degrees, ten degrees, twenty degrees, thirty degrees, etc. These lines make the same angle with the respective edges $b$ and $c$ as the angular adjustments necessary in the latitude indicated. Thus the line marked zero degrees describes an angle away from the edge $c$ of six degrees, four minutes.

Let it be assumed then that the D and E flaps are turned away from one another as indicated in Fig. 2 and the great circle course drawn between the points S and R as previously indicated. It is now desired to continue the great circle course to the 20° E. meridian of longitude. The flap E is then turned counter-clockwise to the dotted line position on the 10° E. element, the point R, of course, would then occupy the position $R^1$ on the map. When the flap is so turned, the protractor is placed with the intersection of its long edge $c$, and center line $d$, at the point R where the course terminates on or at the edge of the flap E, the long edge $c$ being placed parallel to or coinciding with the previous direction of the course and the new direction of the course is laid off at the end of the line thirty degrees on the protractor and a new line $R^1$—T is formed. Similarly on the larger scale showing of Fig. 3, great circle courses may be similarly plotted as indicated for example by the broken lines

U—V—W—X

I claim:

1. A flat map of a portion of the earth's surface adjacent one of the poles, said map being of segmental form provided with a set of radial lines equiangularly spaced apart and representing portions of circles of longitude passing through the pole-indicating-apex of the map and provided with a set of equidistantly spaced apart concentric lines representing coacting portions of circles of latitude, both sets of lines being laid off to a true scale and measured in preselected units of distance, a plurality of flaps, one for each longitude line and hingedly connected at one edge to its associate longitude line and adapted to be swung in opposite directions into position parallel to the face of the map, each of said flaps having its maximum width adjacent its midlength and reducing gradually therefrom in width towards its opposite ends, and the free edges of the flaps representing the true meridians and when the flaps are parallel to the face of the map, the distance between points on the outer free edges of a pair of adjacent flaps when disposed in position relatively turned away from each other on the map surface being equal to the actual distance apart of these two points on the earth's surface when measured in said preselected units of distance.

2. A flat map of a portion of the earth's surface being of segmental form and provided with two radial lines representing portions of circles passing through the poles and forming an angle therebetween representing a fraction of the entire circumference along any line of latitude and provided with a line representing an intersecting circle of latitude, a pair of flaps, one for each longitudinal line and hingedly connected at one edge to its associated longitudinal line and adapted to be swung in opposite directions into engagement with the face of the map, the distance between the outside edges of the flaps when turned away from each other and measured along said latitude line being equal to $2\pi$ times the radius of the earth multiplied by the sine of the complementary angle of said latitude in the scale of distances represented on the map divided by the said fraction.

3. A map representing a portion of the earth's surface and comprising the developed surface of at least a portion of a cone, elements of the conic surface being depicted thereon at predetermined intervals to form meridians of longitude and an arc of latitude both of the same true scale lengths, flaps secured along said elements and, when said flaps are turned away from one another into parallel relationship with the map surface, the distance between the edges of adjacent flaps and measured along said depicted arc of latitude being equal to the true scale distance on the surface of the earth between the respective meridians of longitude and measured along the corresponding arc of latitude.

4. A map comprising the developed surface of at least a portion of a cone, concentric circular arcs depicted on said surface at true scale distances to represent parallels of latitude, elements of the conic surface being depicted thereon at predetermined intervals to represent meridians of longitude and of the same true scale lengths, flaps secured along said elements, and when said flaps are turned away from one another into parallel relationship with the map surface, the distance between any two points on the edges of adjacent flaps being equal to the true scale distance on the surface of the earth when measured along the corresponding great circle.

5. A map comprising the developed surface of at least a portion of a cone, concentric circular arcs depicted on said surface at true scale distances to represent parallels of latitude, elements of the conic surface being depicted thereon at predetermined intervals to represent meridians of longitude and of the same true scale lengths, flaps secured along said elements and turned away from one another into parallel relationship with the map surface, the distance between any two points, respectively, on the edges of adjacent flaps is equal to the true scale distance on the surface of the earth between the respective meridians of longitude when measured along the corresponding great circle, portions of predetermined intermediate flaps at the pole being omitted.

6. A showing of a portion of a sphere in flat form, comprising the developed surface of a portion of a cone representing the portion of the sphere depicted and having elements of the sphere represented thereon, flaps hingedly secured along said elements of the conic surface, the area of proximate faces of adjacent flaps together with the area of the conic surface between the corresponding elements equalling, at a predetermined scale, the true projected area of that portion of the sphere represented thereby.

7. A map of a portion of the earth's surface comprising the developed surface of a portion of a cone having depicted thereon spaced apart elements of the conic surface and a pair of flaps hingedly secured along said elements, the area of proximate faces of the two outside flaps together with the area of the conic surface between their corresponding elements together with the area on both sides of all intermediate flaps equalling, at a predetermined scale, the true projected area of that portion of the earth's surface represented between the two outside elements.

8. A map representing a portion of the earth's surface comprising the developed surface of a portion of a cone, flaps hingedly secured along elements of the conic surface, each flap having its maximum width adjacent its midlength and gradually reducing in width therefrom towards its opposite ends.

9. A map representing a portion of the earth's surface and comprising the developed surface of a frustum of a cone with its center at the pole, and defined in part by two spaced concentric arcs of latitude at true scale distances from one another and of true scale lengths, elements of the conic surface being depicted thereon at predetermined intervals and representing meridians of longitude, flaps hingedly secured along said elements and turned away from one another into parallel relationship with the map surface, the distance between any two points, respectively on the edges of adjacent flaps equals the true scale distance on the surface of the earth between the respective meridians of longitude when measured along a corresponding great circle.

10. A map of a portion of the earth's surface including a flat surface having a flap hinged thereto for movement into a plane parallel to the flat surface, a representation of a physical part of the earth's surface depicted on the map in the true scale on which the map is drawn, said representation being contained partly on the flat surface and continuing therefrom uninterruptedly on to the adjacent face of the flap.

11. A map comprising the developed surface of a portion of a cone, and flaps hingedly secured along elements of the conic surface for folding movement in opposite directions into parallel relation with the map surface, a representation of a part of the earth's surface depicted on the map and contained partly on the flat surface and partly on the flaps.

12. A protractor for the laying out of a great circle course on a map provided with flaps along meridian lines, comprising an elongated sheet of transparent material whereof the longer edges are parallel, a center line inscribed thereon perpendicular to said longer edges and lines inscribed on said sheet radiating from the point of intersection of the center line and each edge and angles with said edges representing the angular adjustment necessary at the different latitudes with selected meridian intervals on the associated map.

13. In a device of the class described, the combination of a map including a flat surface and flaps hinged to the surface along parallels of longitude, a representation of a physical part of the earth's surface depicted on the map in the true scale on which the map is drawn, a protractor provided with means for indicating angles for use in changing the direction of great circle lines drawn on the map as they cross the flaps at different parallels of latitude.

WILLIAM C. ANDERSON.